(12) United States Patent
Tsukizaki

(10) Patent No.: US 11,192,440 B2
(45) Date of Patent: Dec. 7, 2021

(54) HYBRID VEHICLE

(71) Applicant: Nissan Motor Co., Ltd., Yokohama (JP)

(72) Inventor: Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/273,766

(22) PCT Filed: Oct. 5, 2018

(86) PCT No.: PCT/JP2018/037401
§ 371 (c)(1),
(2) Date: Mar. 5, 2021

(87) PCT Pub. No.: WO2020/070882
PCT Pub. Date: Apr. 9, 2020

(65) Prior Publication Data
US 2021/0197656 A1    Jul. 1, 2021

(51) Int. Cl.
*B60K 6/36* (2007.10)
*B60K 6/40* (2007.10)
*B60K 6/48* (2007.10)

(52) U.S. Cl.
CPC .................. *B60K 6/36* (2013.01); *B60K 6/40* (2013.01); *B60K 6/48* (2013.01)

(58) Field of Classification Search
CPC ... B60K 6/36; B60K 6/40; B60K 6/48; B60K 6/442; B60K 6/387
See application file for complete search history.

(56) References Cited

U.S. PATENT DOCUMENTS

| | | | | |
|---|---|---|---|---|
| 2018/0298993 A1* | 10/2018 | Fliearman | .............. | B60K 6/387 |
| 2021/0229558 A1* | 7/2021 | Forte | ..................... | B60K 6/442 |
| 2021/0252962 A1* | 8/2021 | Yano | ..................... | F16H 57/021 |

FOREIGN PATENT DOCUMENTS

| | | |
|---|---|---|
| JP | 2015-20449 A | 2/2015 |
| JP | 590023 B2 | 4/2016 |
| JP | 2018-24405 A | 2/2018 |

* cited by examiner

*Primary Examiner* — David J Hlavka
(74) *Attorney, Agent, or Firm* — Global IP Counselors, LLP

(57) ABSTRACT

A hybrid vehicle includes an internal combustion engine, an electric-power generator, an electric motor and a transmission device. The transmission device includes an input gear, an output gear, an intermediate gear, a case and a connection-disconnection device. The connection-disconnection device is configured to switch between connecting and disconnecting a path along which the drive force is inputted to the input gear. When viewed from a direction long a rotational axis, a rotational axis of an intermediate gear is positioned vertically higher than a straight line that links a rotational axis of the input gear and a rotational axis of the output gear.

7 Claims, 2 Drawing Sheets

HYBRID VEHICLE

CROSS-REFERENCE TO RELATED APPLICATIONS

This application is a U.S. national stage application of International Application No. PCT/JP2018/037401, filed on Oct. 5, 2018.

BACKGROUND

Technical Field

The present invention relates to a hybrid vehicle.

Background Information

Japanese Patent Publication No. 5,900,023 (Patent Document 1) discloses a hybrid vehicle capable of traveling while switching between a series scheme and a parallel scheme. In this hybrid vehicle, a transmission device for realizing the parallel scheme is installed between an internal combustion engine and drive wheels. The transmission device has an input gear connected to the internal combustion engine, an output gear connected to the drive wheels, an intermediate gear connecting the input gear and the output gear, and a clutch that connects and disconnects a drive force transmission path between the internal combustion engine and the input gear.

SUMMARY

In the arrangement configuration of the gears in the prior art described above, a problem is presented in that the intermediate gear, which is rotating at all times while the drive wheels are rotating, is arranged the lowest and submerged in a lubricating oil reservoir; therefore, agitation resistance increases and fuel consumption worsens. An object of the present invention is to provide a hybrid vehicle in which fuel consumption can be improved.

In a hybrid vehicle of the present invention, in a transmission device that transmits drive force generated by an internal combustion engine to drive wheels, a rotational axis of an intermediate gear is positioned vertically higher than a straight line connecting a rotational axis of an input gear and a rotational axis of an output gear, as seen from a direction following the rotational axes of the gears.

Consequently, fuel consumption can be improved because the degree to which the lubricating oil is agitated by the intermediate gear can be reduced.

BRIEF DESCRIPTION OF THE DRAWINGS

Referring now to the attached drawings which form a part of this original disclosure.

DETAILED DESCRIPTION OF EMBODIMENTS

Figure 1:
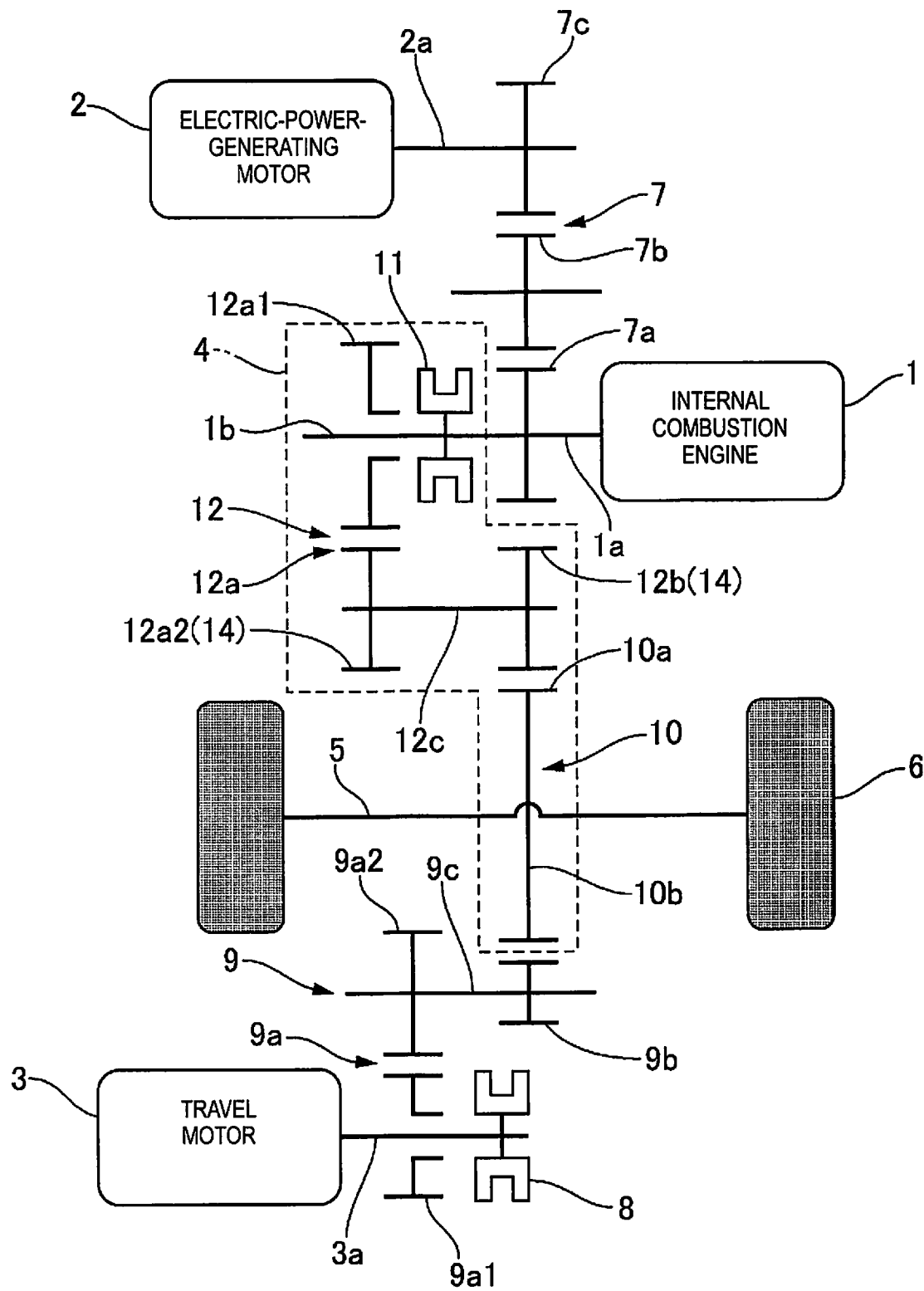
FIG. 1 is an overview diagram of a drive system of a hybrid vehicle in accordance with a first embodiment.

An embodiment for implementing the hybrid vehicle according to the present disclosure will be described below based on a first embodiment illustrated in the drawings.

First Embodiment

FIG. 1 is an overview diagram of a drive system of a hybrid vehicle of a first embodiment. The hybrid vehicle of the first embodiment has an internal combustion engine 1, an electric-power-generating motor (electric-power generator) 2, a travel motor (electric motor) 3, a transmission device 4, an electric-power-generating motor gear train (second transmission device) 7, driveshafts (output shafts) 5, and drive wheels 6. Assuming the transmission device 4 and the internal combustion engine 1 side of the electric-power-generating motor gear train 7 are on one end (the right side in the drawing) and the opposite side is on the other end (the left side in the drawings), the electric-power-generating motor 2 and the travel motor 3 are disposed on the other-end side. Due to this configuration, heat generation due to the agitation of the lubricating oil can be minimized and excessive temperature increases can be suppressed in an environment in which the transmission device 4 and the electric-power-generating motor gear train 7 are surrounded by the internal combustion engine 1, the electric-power-generating motor 2, and the travel motor 3, and the thermal environment is severe (it is difficult for heat to dissipate). A crankshaft 1a of the internal combustion engine 1 is coupled with an input shaft 1b. The input shaft 1b is coupled with a motor shaft 2a of the electric-power-generating motor 2 via the electric-power-generating motor gear train 7. The electric-power-generating motor gear train 7 has three gears 7a, 7b, 7c. The first gear (second input gear) 7a rotates integrally with the input shaft 1b. The third gear (second output gear) 7c rotates integrally with the motor shaft 2a. The second gear (second intermediate gear) 7b meshes with both the first gear 7a and the third gear 7c.

A motor shaft 3a of the travel motor 3 is coupled with a travel-motor reduction mechanism 9 via a motor travel clutch 8. The travel-motor reduction mechanism 9 has a travel-motor gear train 9a and a travel-motor final reduction gear 9b. The travel-motor gear train 9a has two gears 9a1, 9a2 that mesh with each other. The first gear 9a1 is coupled with one engagement element in the motor travel clutch 8. Another engagement element is coupled with the motor shaft 3a. The second gear 9a2 is coupled with the travel-motor final reduction gear 9b by a rotating shaft 9c. The travel-motor final reduction gear 9b meshes with a ring gear (output gear) 10a of a differential 10 in the transmission device 4. The motor travel clutch 8 allows relative rotation of the motor shaft 3a and the first gear 9a1 by releasing and restricts relative rotation of the motor shaft 3a and the first gear 9a1 by engaging.

The transmission device 4 has, in addition to the differential 10, an internal-combustion-engine travel clutch (engaging/disengaging device) 11 and an internal-combustion-engine travel gear set 12. The internal-combustion-engine travel clutch 11 allows relative rotation of the input shaft 1b and a first gear (input gear) 12a1 of the internal-combustion-engine travel gear set 12 by releasing, and restricts relative rotation of the input shaft 1b and the first gear 12a1 of the internal-combustion-engine travel gear set 12 by engaging. The internal-combustion-engine travel gear set 12 has an internal-combustion-engine travel gear train 12a and an internal-combustion-engine final reduction gear (intermediate gear) 12b. The internal-combustion-engine travel gear train 12a has two gears: the first gear 12a1 and a second gear (intermediate gear) 12a2, which mesh with each other. The first gear 12a1 is linked with one engagement element in the internal-combustion-engine travel clutch 11. Another engagement element is linked with the input shaft 1b. The second gear 12a2 is linked with the internal-combustion-engine final reduction gear (intermediate gear) 12b by a rotating shaft 12c. The second gear 12a2 and the internal-combustion-engine final reduction gear 12b are coupled by the rotating shaft 12c and have the same number of teeth, and can therefore be regarded as one intermediate gear 14. The internal-combustion-engine final reduction gear 12b meshes with the ring gear 10a. The differential 10 has, other than the ring gear 10a, a differential case 10b having an actuating mechanism unit (not shown) in the interior. Left and right side gears of the actuating mechanism unit are joined to left and right driveshafts 5. The left and right driveshafts 5 are joined to the drive wheels 6.

By engaging the motor travel clutch 8 and releasing the internal-combustion-engine travel clutch 11, the hybrid vehicle of the first embodiment travels in a series hybrid mode in which only the travel motor 3 is used as a motive power source for travel and the internal combustion engine 1 is used as a motive power source for electric power generation. In addition, by releasing the motor travel clutch 8 and engaging the internal-combustion-engine travel clutch 11, the hybrid vehicle travels in an internal-combustion-engine direct coupling mode in which only the internal combustion engine 1 is used as a motive power source for travel. By engaging both of the clutches 8, 11, the hybrid vehicle enables travel in a parallel hybrid mode.

Figure 2:
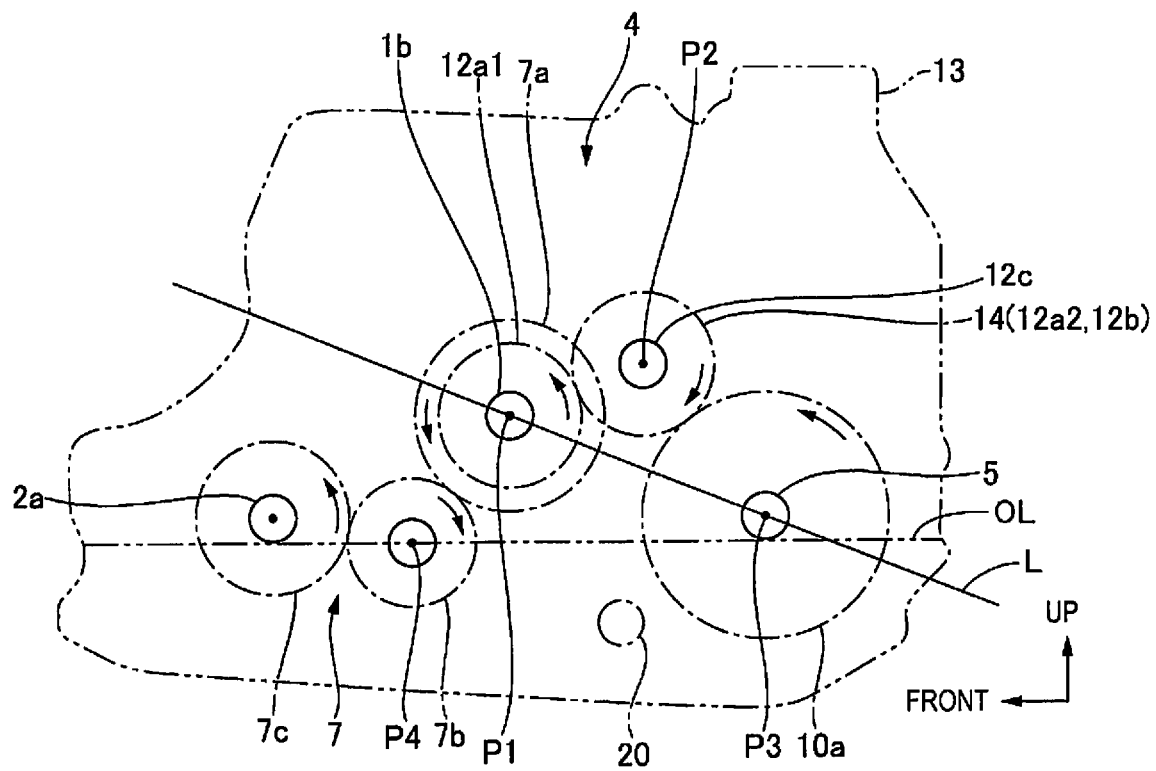
FIG. 2 is a schematic diagram of a transmission device 4 and a second transmission device 7 as seen from a direction following rotational axes of gears of the first embodiment.
Figure 3:
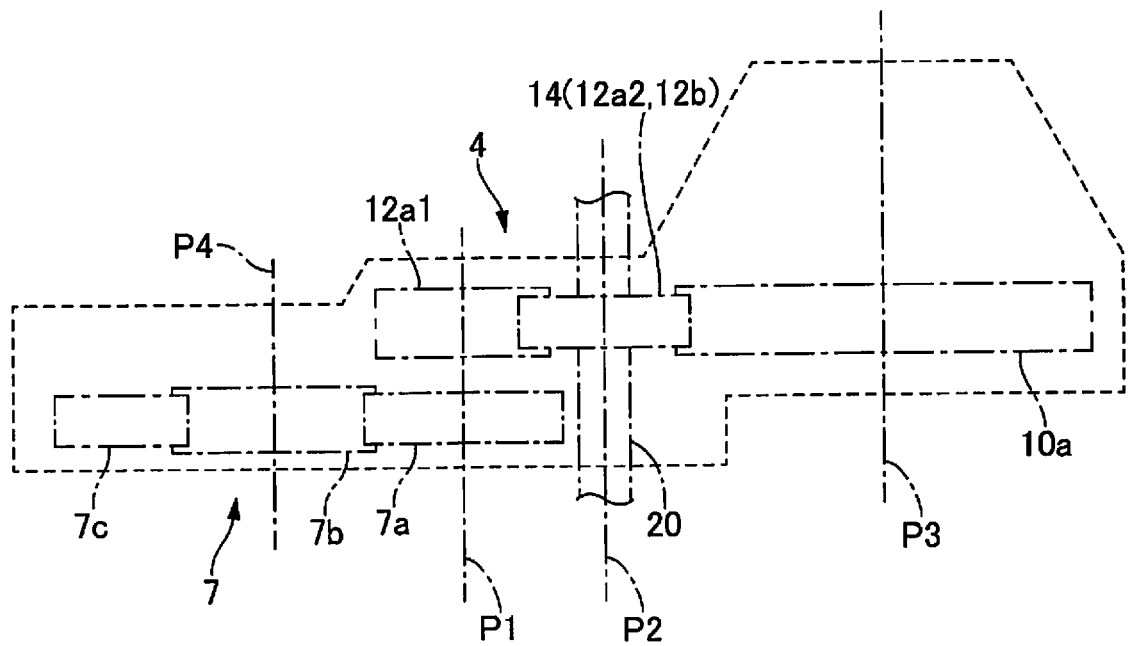
FIG. 3 is a schematic diagram of the transmission device 4 and the second transmission device 7 as seen from vertically above in the first embodiment.

FIG. 2 is a schematic diagram of the transmission device 4 and the second transmission device 7 as seen from a direction following the rotational axes of the gears of the first embodiment. FIG. 3 is a schematic diagram of the transmission device 4 and the second transmission device 7 as seen from directly above in the first embodiment. A case 13 accommodates the electric-power-generating motor gear train 7 and the travel-motor reduction mechanism 9 in addition to the constituent elements (differential 10, internal-combustion-engine travel clutch 11, and internal-combustion-engine travel gear set 12) of the transmission device 4. The electric-power-generating motor gear train 7 is configured from the first gear (second input gear) 7a to which drive force from the internal combustion engine 1 is inputted, the third gear (second output gear) 7c which outputs the drive force to the electric-power-generating motor 2, and the second gear (second intermediate gear) 7b which transmits the drive force between the second input gear 7a and the second output gear 7c. The ring gear 10a of the differential 10 and the second gear 7b and third gear 7c of the electric-power-generating motor gear train 7 are disposed in a vertically lower part of the case 13. Vertically lowest parts of the ring gear 10a, the second gear 7b, and the third gear 7c are positioned lower than an oil level OL of a lubricating oil reservoir retained in the vertically lower part inside the case 13. The oil level OL is set at a height at which the vertically lowest parts of the ring gear 10a, the second gear 7b, and the third gear 7c are submerged at all times.

When viewed from a direction following the rotational axes of the gears, a rotational axis P2 of the intermediate gear 14 (the second gear 12a2 and the internal-combustion-engine final reduction gear 12b) is positioned vertically higher than a straight line L that links a rotational axis P1 of the first gear 12a1 and a rotational axis P3 of the ring gear 10a. In addition, the rotational axis P2 of the intermediate gear 14 (the second gear 12a2 and the internal-combustion-engine final reduction gear 12b) is positioned vertically higher than a rotational axis P4 of the second gear 7b of the electric-power-generating motor gear train 7. Furthermore, a vertically lowest part of the intermediate gear 14 (the second gear 12a2 and the internal-combustion-engine final reduction gear 12b) is positioned vertically higher than the vertically lowest parts of the first gear 12a1, the ring gear 10a, and the first gear 7a, second gear 7b, and third gear 7c of the electric-power-generating motor gear train 7.

The first gear 12a1 of the internal-combustion-engine travel gear set 12, the first gear 7a of the electric-power-generating motor gear train 7, and the intermediate gear 14 (the second gear 12a2 and the internal-combustion-engine final reduction gear 12b) are disposed in positions higher than the second gear 7b of the electric-power-generating motor gear train 7. The vertically lowest parts of the first gear 12a1, the first gear 7a, and the intermediate gear 14 (the second gear 12a2 and the internal-combustion-engine final reduction gear 12b) are positioned vertically higher than the oil level OL of the lubricating oil reservoir and are not submerged in the lubricating oil. In FIG. 2, the arrows inside the imaginary lines of the gears indicate rotation directions when the vehicle is advancing.

Due to this configuration, even if the amount of lubricating oil is set to be large and the second gear 7b is readily submerged in the lubricating oil reservoir in preparation for electric power generation in which the electric-power-generating motor 2 is driven by the internal combustion engine 1 while the vehicle is stopped, the rotational axis P2 of the intermediate gear 14 (the second gear 12a2 and the internal-combustion-engine final reduction gear 12b) is positioned vertically higher than the straight line L linking the rotational axis P1 of the first gear 12a1 and the rotational axis P3 of the ring gear 10a, the rotational axis P2 of the intermediate gear 14 (the second gear 12a2 and the internal-combustion-engine final reduction gear 12b) is positioned vertically higher than the rotational axis P4 of the second gear 7b of the electric-power-generating motor gear train 7, and furthermore, the vertically lowest part of the intermediate gear 14 (the second gear 12a2 and the internal-combustion-engine final reduction gear 12b) is positioned vertically higher than the vertically lowest parts of the first gear 7a, second gear 7b, and third gear 7c of the electric-power-generating motor gear train 7 as well as being positioned vertically higher than the oil level OL of the lubricating oil reservoir and not submerged in the lubricating oil; therefore, the degree to which the lubricating oil is agitated by the intermediate gear 14 (the second gear 12a2 and the internal-combustion-engine final reduction gear 12b) is reduced, and improvement in fuel consumption and reduction in the amount of heat generated are made possible.

Vertically below the intermediate gear 14 (the second gear 12a2 and the internal-combustion-engine final reduction gear 12b), an oil cooler 20 is disposed overlapping at least part of the intermediate gear 14 (the second gear 12a2 and the internal-combustion-engine final reduction gear 12b). The oil cooler 20 is a pipe for cooling water drawn into the lubricating oil reservoir. The oil cooler 20 can establish a water passage for cooling water in a wall of the case 13 vertically below the intermediate gear 14 (the second gear 12a2 and the internal-combustion-engine final reduction gear 12b). It is thereby possible to arrange the oil cooler 20 using a space opened vertically below the intermediate gear 14 (the second gear 12a2 and the internal-combustion-engine final reduction gear 12b) and to lower the temperature of the lubricating oil while efficiently using this space.

Effects of the first embodiment shall next be described.

(1) The rotational axis P2 of the intermediate gear 14 (the second gear 12a2 and the internal-combustion-engine final reduction gear 12b) is positioned vertically higher than the straight line L linking the rotational axis P1 of the first gear 12a1 and the rotational axis P3 of the ring gear 10a. Consequently, the degree to which the lubricating oil is agitated by the intermediate gear 14 (the second gear 12a2 and the internal-combustion-engine final reduction gear 12b) is reduced, and improvement in fuel consumption and reduction in the amount of heat generated are made possible.

(2) The rotational axis P2 of the intermediate gear 14 (the second gear 12a2 and the internal-combustion-engine final reduction gear 12b) is positioned vertically higher than the rotational axis P4 of the second gear 7b of the electric-power-generating motor gear train 7. Consequently, the degree to which the lubricating oil is agitated by the intermediate gear 14 (the second gear 12a2 and the internal-combustion-engine final reduction gear 12b) is reduced, and further improvement in fuel consumption and further reduction in the amount of heat generated are made possible.

(3) The vertically lowest part of the intermediate gear 14 (the second gear 12a2 and the internal-combustion-engine final reduction gear 12b) is positioned vertically higher than the vertically lowest part of the second gear 7b of the electric-power-generating motor gear train 7. Consequently, the degree to which the lubricating oil is agitated by the intermediate gear 14 (the second gear 12a2 and the internal-combustion-engine final reduction gear 12b) is reduced, and further improvement in fuel consumption and further reduction in the amount of heat generated are made possible.

(4) Assuming the transmission device 4 and the internal combustion engine 1 side of the electric-power-generating motor gear train 7 are on one end and the opposite side is on the other end, the electric-power-generating motor (electric-power generator) 2 and the travel motor (electric motor) 3 are disposed on the other-end side. Due to this configuration, heat generation due to the agitation of the lubricating oil can be minimized and excessive temperature increases can be suppressed in an environment in which the transmission device 4 and the second transmission device 7 are surrounded by the internal combustion engine 1, the electric-power-generating motor 2, and the travel motor 3, and the thermal environment is severe (it is difficult for heat to dissipate).

(5) Vertically below the intermediate gear 14 (the second gear 12a2 and the internal-combustion-engine final reduction gear 12b), the oil cooler 20 is disposed overlapping at least part of the intermediate gear 14 (the second gear 12a2 and the internal-combustion-engine final reduction gear 12b). It is thereby possible to arrange the oil cooler 20 using a space opened vertically below the intermediate gear 14 (the second gear 12a2 and the internal-combustion-engine final reduction gear 12b) and to lower the temperature of the lubricating oil while efficiently using this space.

(6) The vertically lowest part of the intermediate gear 14 (the second gear 12a2 and the internal-combustion-engine final reduction gear 12b) is positioned vertically higher than the vertically lowest parts of the first gear 12a1 and the ring gear 10a. Consequently, the degree to which the lubricating oil is agitated by the intermediate gear 14 (the second gear 12a2 and the internal-combustion-engine final reduction gear 12b) is reduced, and further improvement in fuel consumption and further reduction in the amount of heat generated are made possible.

The vertically lowest part of the intermediate gear 14 (the second gear 12a2 and the internal-combustion-engine final reduction gear 12b) is positioned vertically higher than the oil level OL of the lubricating oil reservoir. Consequently, the degree to which the lubricating oil is agitated by the intermediate gear 14 (the second gear 12a2 and the internal-combustion-engine final reduction gear 12b) is more reliably reduced, and further improvement in fuel consumption and further reduction in the amount of heat generated are made possible.

(8) The vertically lowest part of the intermediate gear 14 (the second gear 12a2 and the internal-combustion-engine final reduction gear 12b) is positioned vertically higher than the oil level OL of the lubricating oil reservoir, and the oil level OL is set at a height at which the vertically lowest part of the second gear 7b is continuously submerged. Consequently, even if the amount of lubricating oil is increased in preparation for electric power generation while the vehicle is stopped, the degree to which the lubricating oil is agitated by the intermediate gear 14 (the second gear 12a2 and the internal-combustion-engine final reduction gear 12b) is more reliably reduced, and further improvement in fuel consumption and further reduction in the amount of heat generated are made possible.

Other Embodiments

A mode for carrying out the present invention has been described above on the basis of an embodiment, but the specific configuration of the present invention is not limited to this embodiment; design changes, etc., that do not depart from the scope of the invention are also included in the present invention.

The invention claimed is:
1. A hybrid vehicle comprising:
an internal combustion engine;
an electric-power generator that receives a drive force generated by the internal combustion engine and generates electric power;
an electric motor that receives a supply of electric power generated by the electric-power generator and drives a drive wheel;
a first transmission device that transmits the drive force generated by the internal combustion engine to the drive wheel;
a second transmission device that transmits the drive force generated by the internal combustion engine to the electric-power generator; and
a case that accommodates the first transmission device and the second transmission device,
the first transmission device having a first input gear, a first output gear, a first intermediate gear and a connection-disconnection device,
the first input gear being configured to receive the drive force as an input from the internal combustion engine,
the first output gear being configured to output the drive force to the drive wheel,
the first intermediate gear being configured to transmit the drive force between the first input gear and the first output gear,
the connection-disconnection device being configured to switch between disconnecting and connecting a path along which the drive force is inputted to the first input gear,
the second transmission device having a second input gear, a second output gear and a second intermediate gear, the second input gear being configured to receive the drive force as an input from the internal combustion engine, the second output gear being configured to output the drive force to the electric-power generator, the second intermediate gear being configured to transmit the drive force between the second input gear and the second output gear, a rotational axis of the first intermediate gear being positioned vertically higher than a straight line that links a rotational axis of the first input gear and a rotational axis of the first output gear as seen from a direction along the rotational axes of the first input and output gears, and the rotational axis of the first intermediate gear being positioned vertically higher than a rotational axis of the second intermediate gear as seen from the direction along the rotational axes of the first and second intermediate gears.

2. The hybrid vehicle according to claim 1, wherein a vertically lowest part of the first intermediate gear is positioned vertically higher than a vertically lowest part of the second intermediate gear as seen from the direction along the rotational axes of the first and second intermediate gears.

3. The hybrid vehicle according to claim 1, wherein when an internal combustion engine side of the first transmission device is designated as one end and an opposite side as the other-end side, the electric-power generator and the electric motor are disposed on the other-end side of the first transmission device.

4. The hybrid vehicle according to claim 1, further comprising an oil cooler disposed vertically below the first intermediate gear so as to overlap part of the first intermediate gear.

5. The hybrid vehicle according to claim 1, wherein a vertically lowest part of the first intermediate gear is positioned vertically higher than both a vertically lowest part of the first input gear and a vertically lowest part of the first output gear.

6. The hybrid vehicle according to claim 1, wherein a vertically lowest part of the first intermediate gear is positioned vertically higher than an oil level of a lubricating oil reservoir inside the case.

7. The hybrid vehicle according to claim 2, wherein a vertically lowest part of the second intermediate gear is submerged in a lubricating oil reservoir inside the case.

* * * * *